US008234558B2

(12) United States Patent
Swift et al.

(10) Patent No.: US 8,234,558 B2
(45) Date of Patent: Jul. 31, 2012

(54) ADAPTIVE ARTWORK FOR BANDWIDTH-AND/OR MEMORY-LIMITED DEVICES

(75) Inventors: Michael J. E. Swift, Mountain View, CA (US); Alex Kan, Mountain View, CA (US); Sean Gies, San Fransisco, CA (US); Charles John Pisula, San Jose, CA (US); Sean B. Kelly, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 989 days.

(21) Appl. No.: 11/770,635

(22) Filed: Jun. 28, 2007

(65) Prior Publication Data

US 2009/0006978 A1 Jan. 1, 2009

Related U.S. Application Data

(60) Provisional application No. 60/945,898, filed on Jun. 22, 2007.

(51) Int. Cl.
*G06N 3/00* (2006.01)

(52) U.S. Cl. ......................... 715/200; 715/234; 715/744

(58) Field of Classification Search .................. 715/234, 715/243, 254, 200, 744
See application file for complete search history.

(56) References Cited

U.S. PATENT DOCUMENTS

| | | | | |
|---|---|---|---|---|
| 5,767,858 A * | 6/1998 | Kawase et al. | ................ | 345/552 |
| 6,466,237 B1 * | 10/2002 | Miyao et al. | .................. | 715/838 |
| 2004/0254955 A1 * | 12/2004 | Reese et al. | ................ | 707/104.1 |
| 2007/0160134 A1 * | 7/2007 | Segall | ........................ | 375/240.1 |

OTHER PUBLICATIONS

Padova, "Adobe Reader 7 Revealed: Working Effectively with Acrobat PDF Files", 2005, pp. 70-76.*

* cited by examiner

*Primary Examiner* — Kyle Stork
(74) *Attorney, Agent, or Firm* — Blakely, Sokoloff, Taylor & Zafman LLP

(57) ABSTRACT

Methods and apparatuses for adaptive presentation of graphical representations.

33 Claims, 8 Drawing Sheets

ADAPTIVE ARTWORK FOR BANDWIDTH-AND/OR MEMORY-LIMITED DEVICES

TECHNICAL FIELD

The invention relates to display devices. More particularly, the invention relates to techniques for providing to provide adaptive artwork to support more efficient resource usage in bandwidth-limited and/or memory-limited electronic devices.

BACKGROUND

Electronic devices, for example, computer systems, cellular telephones, media playback devices, often provide a graphical interface to a user of the device. The graphical interface may include an indication of the current functionality of the device or available options. In desktop computer systems and other devices resources such as bandwidth and memory are generally sufficient to provide complete functionality. However, smaller mobile devices may have reduced bandwidth, memory or other resources as compared to the desktop system. Because users of mobile devices often desire the functionality and/or graphical interface of the desktop system, it would be beneficial to provide graphical user interfaces on mobile devices.

SUMMARY

Techniques for managing and displaying graphical objects are described. In one embodiment, a file is received in a format natively supported from a host electronic device by a client electronic device. The file is stored in a first storage device on the client electronic device in the format natively supported at a first resolution and at a second resolution. A first cache memory is managed to store N files in the first resolution. A second cache memory is managed to store M files in the second resolution. At least one graphical object corresponding to the N files is displayed and multiple graphical objects corresponding to the M files is displayed.

In one embodiment, a file representing a graphical representation to be displayed is received by a host device. The file is modified, if necessary, by the host device to a format natively supported by a client device. The file is transmitted in the native format from the host device to the client device.

In one embodiment, the first cache memory is managed as a ring buffer. In one embodiment, the second cache memory is managed as a ring buffer. In one embodiment, the graphical representation comprises an artistic facsimile, for example, album artwork.

In one embodiment, modifying the file to the format natively supported by the client device includes determining data formats supported by the client device, determining whether a current format of the file matches the formats supported by the client electronic device, and converting the current format to a format supported by the client device.

In one embodiment, the first storage device is a mass storage device. In one embodiment, the second resolution is approximately half of the first resolution. In one embodiment, M is greater than N. In one embodiment, the higher-resolution file is displayed in a first visual region and the lower-resolution files are displayed in a second visual region. In one embodiment, the second visual region has a different perspective than the first visual region.

In one embodiment, the client device comprises a mobile electronic device. In one embodiment, the mobile electronic device comprises a cellular-enabled electronic device. In one embodiment, the cellular-enables electronic device comprises a smartphone. In one embodiment, the mobile electronic device comprises a media playback device.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described in greater detail below are techniques for providing a graphical interfaces on devices having limited bandwidth and/or memory. In one embodiment, to prevent sampling and aliasing artifacts as large content is down-sampled or small content is up-scaled, the techniques described herein, among other things, provide a single texture of varying size. As the resolution changes, image data that is no longer needed is made purgable. Thus, for a fixed number of visible primitives in an animated three-dimensional scene, the amount of memory required to render it at high quality is relatively constant, small and deterministic. This may prevent the need for padding texture allocations to the next power of two as occurs in mip-mapping, the traditional method of addressing the sampling/aliasing problem, and thus may reduce wasted memory, improve cache coherency and reduce memory utilization.

In one embodiment, to prevent artifacts while rendering three-dimensional content, the source image is changed based on an expectation of how the image primitives may move and behave in three-dimensional space. Knowing the ratio between the source image texels and visible pixels on screen, combined with the behavior of the hardware filtering, the system can determine when to change an image between resolutions to prevent aliasing and filtering artifacts. This may allow nearly every source texel to contribute to the final primitive after being transformed and rendered.

Figure 1:
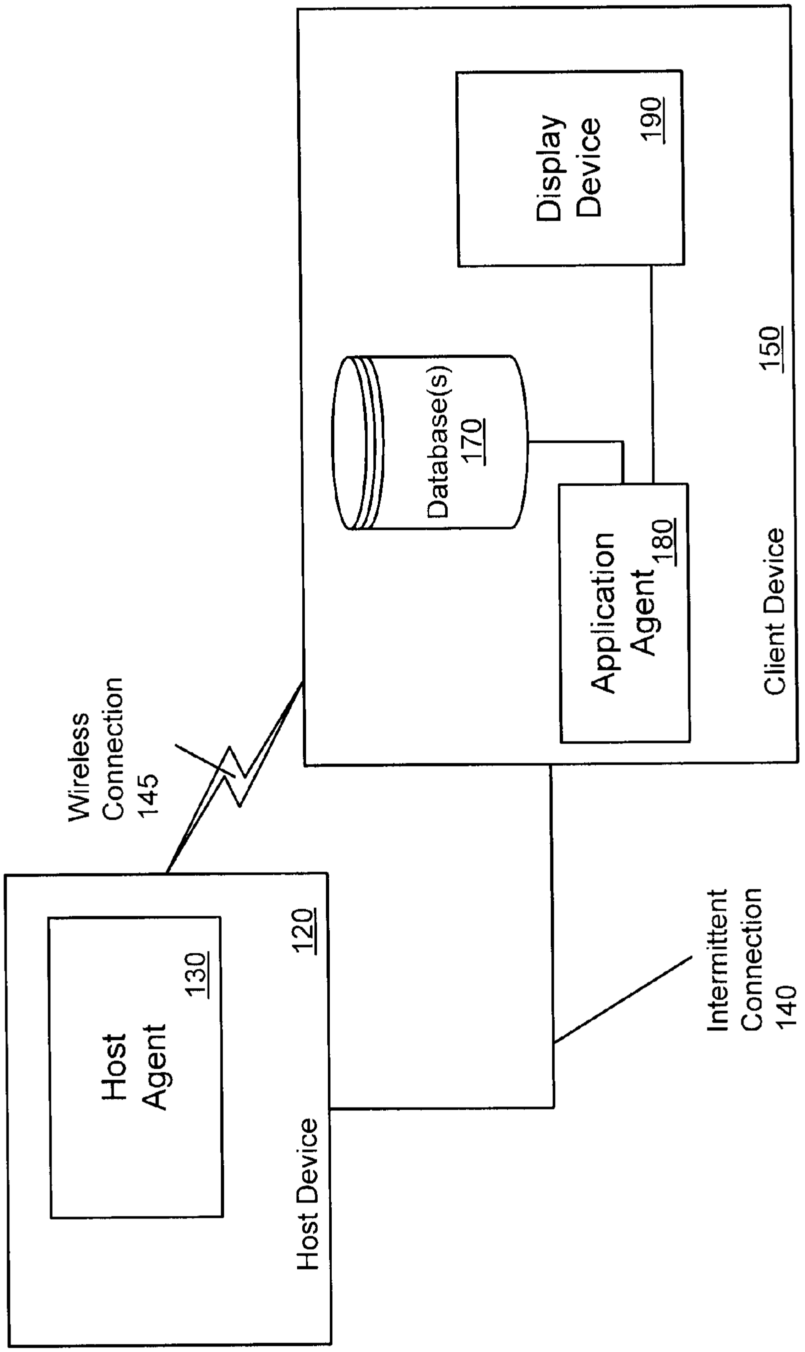
FIG. 1 is a block diagram of an architecture that may support one or more mobile devices utilizing adaptive artwork.

FIG. 1 is a block diagram of an architecture that may support one or more mobile devices utilizing adaptive artwork. While the example of FIG. 1 includes only a single host device and a single mobile device, any number of host devices and any number of mobile devices may be supported utilizing the techniques described herein. Many of the examples provided herein are in terms of album artwork displayed by a mobile device. However, any graphical display may be processed as described herein. Further, the device on which the artwork resides is not required to be mobile. That is, the techniques described herein are applicable to all devices. The physical movement of the device is not required to utilize the techniques described herein.

Client device 150 may be any type of mobile device configured to communicate utilizing wireless protocols. Client device 150 may be, for example, a personal digital assistant (PDA), a cellular device (e.g., smartphone, messaging device, cellular telephone), etc. Client device 150 may be intermittently coupled with host device 120 via any type of wired connection, for example, via a Universal Serial Bus (USB) connection.

Client device 150 may include application agent 180 and database(s) 170. Application agent 180 may provide information to a user of client device 150 via any input/output components of client device 150, for example, display device 190. Application agent 160 may, for example, be a media playback application that may play audio content and/or provide graphical output via display device 190. Client device 150 may have any number of client agents and/or any number of databases.

Database(s) 170 may include information that is utilized by application agent 160 to present information to the user. For example database(s) 170 may store album artwork to be displayed during playback and/or used in association with selection of media for playback. In one embodiment, database(s) 170 include album artwork or other graphical representations in multiple resolutions. Any graphical representation may be stored and presented in the manner described herein. For example, the graphical representations may be icons, photographs, maps or other graphical elements.

Application agent 160 on client device 150 may utilize database(s) 170 to provide useful information to a user of client device 150. For example, application agent 180 may cause album artwork for one or more albums to be displayed in a media playback application. Many other examples may also be supported. Any number of applications and/or databases may be supported by client device 150. Application agent may be implemented as hardware, software, firmware or any combination thereof.

Host device 120 may be any type of electronic device configured to communicate with client device 150. Host device may be, for example, a desktop computer system or a laptop computer system. Intermittent connection 140 may be any type of wired connection between host device 120 and client device 150. In one embodiment, client device 150 may communicate with other electronic devices including host device 120 via the wireless network. Client device 150 may also communicate with host device 120 via intermittent connection 140, when available. In one embodiment, client device 150 may selectively utilize the wireless or the wired connection, if available, to update database(s) 170.

In an alternate embodiment, wireless connection 145 may be utilized to update the contents of database(s) 170 and/or provide other data to client device 150. Wireless connection 145 may be, for example, a Bluetooth-compliant connection or any other type of wireless connection (e.g., IEEE 802.11b-compliant, IEEE 802.11g-compliant, IEEE 802.16-compliant). Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported. Low-bandwidth wireless connection 145 is referred to as low-bandwidth as compared to the wireless network and not because of any specific bandwidth restrictions.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents.

In one embodiment, database updates are automatically initiated when client device 150 is coupled to host device 120 through intermittent connection 140 or wireless connection 145. Intermittent connection 140 and/or wireless connection 145 may be utilized to synchronize client device 150 with host device 120. This may be performed in response to user initiation and results in the transfer of data between host device 120 and client device 150. The synchronization may update many other components and/or agents than those illustrated in FIG. 1.

In one embodiment, host agent 130 may process graphical representations to be stored in database(s) 170 such that data stored in database(s) 170 are in native format for client device 150.

Figure 2:
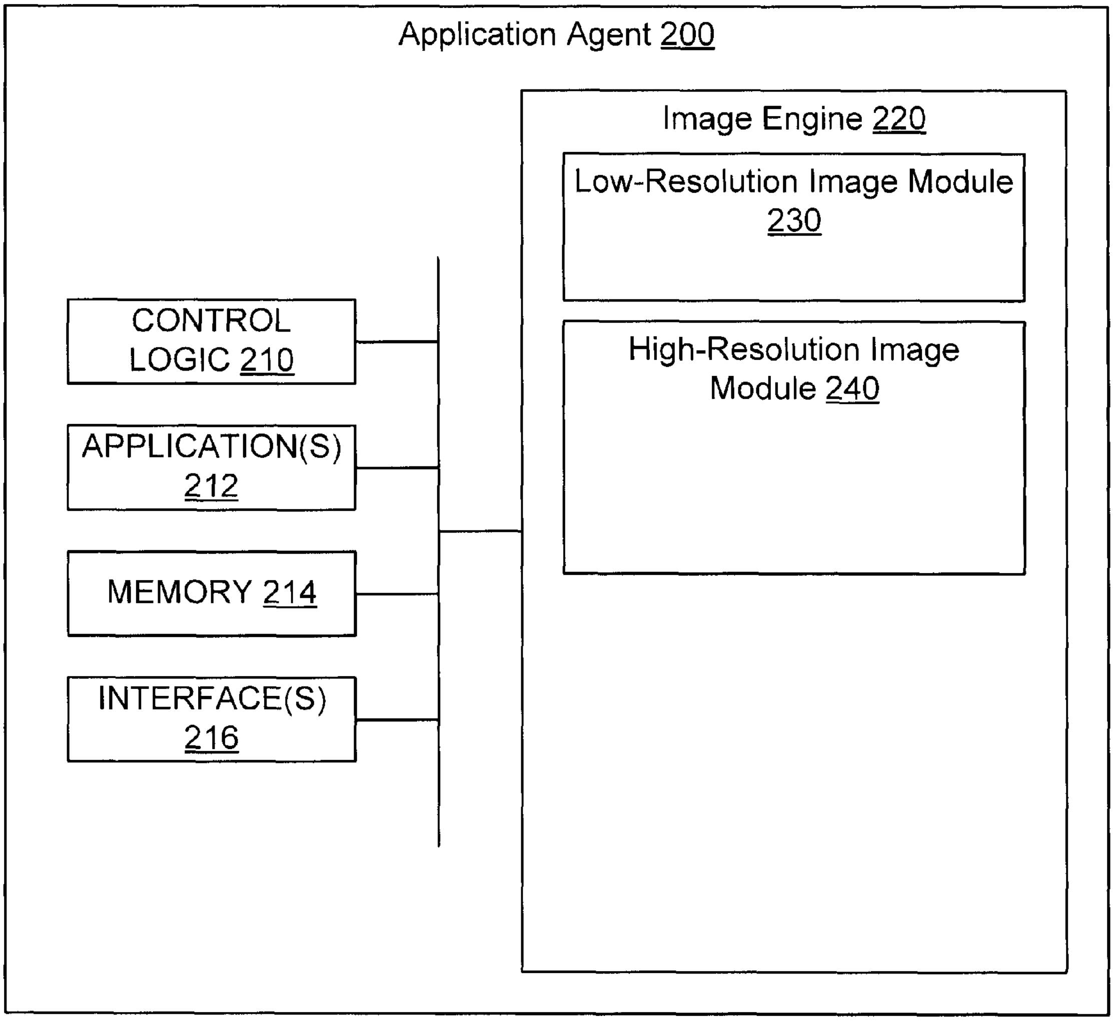
FIG. 2 is a block diagram of one embodiment of an application agent that may be resident on a memory-limited and/or bandwidth-limited device.

FIG. 2 is a block diagram of one embodiment of an application agent that may be resident on a memory-limited and/or bandwidth-limited device. Application agent 200 includes control logic 210, which implements logical functional control to direct operation of application agent 200, and/or hardware associated with directing operation of application agent 200. Logic may be hardware logic circuits and/or software routines. In one embodiment, application agent 200 includes one or more applications 212, which represent code sequence and/or programs that provide instructions to control logic 210.

Application agent 200 includes memory 214, which represents a memory device and/or access to a memory resource for storing data and/or instructions. Memory 214 may include memory local to application agent 200, as well as, or alternatively, including memory of the host system on which application agent 200 resides. Application agent 200 also includes one or more interfaces 216, which represent access interfaces to/from (an input/output interface) application agent 200 with regard to entities (electronic or human) external to application agent 200.

Application agent 200 also includes image engine 220, which represents one or more functions that enable application agent 200 to provide image data (e.g., artwork) to display device 190. Example modules that may be included in image engine 220 are low-resolution image module 230 and high-resolution image module 240. Each of these modules may further include other modules to provide other functions. As used herein, a module refers to routine, a subsystem, etc., whether implemented in hardware, software, or some combination.

Low-resolution image module 230 may store or otherwise provide lower-resolution versions of images. In one embodiment, low-resolution image module 230 includes a buffer of a pre-selected size to store a specified number of images. As the images displayed change, the images stored in the buffer may also change. Techniques for managing the buffer are described in greater detail below. High-resolution image module 240 may store or otherwise provide higher-resolution versions of images. In one embodiment, high-resolution image module 240 includes a buffer of a pre-selected size to store a specified number of images. As the images displayed change, the images stored in the buffer may also change. Techniques for managing the buffer are described in greater detail below.

In one embodiment, the number of images stored in the buffer of high-resolution image module 240 is less than the number of images stored in low-resolution image module 230. In alternate embodiments, a different number of resolution levels may be supported.

Figure 3:
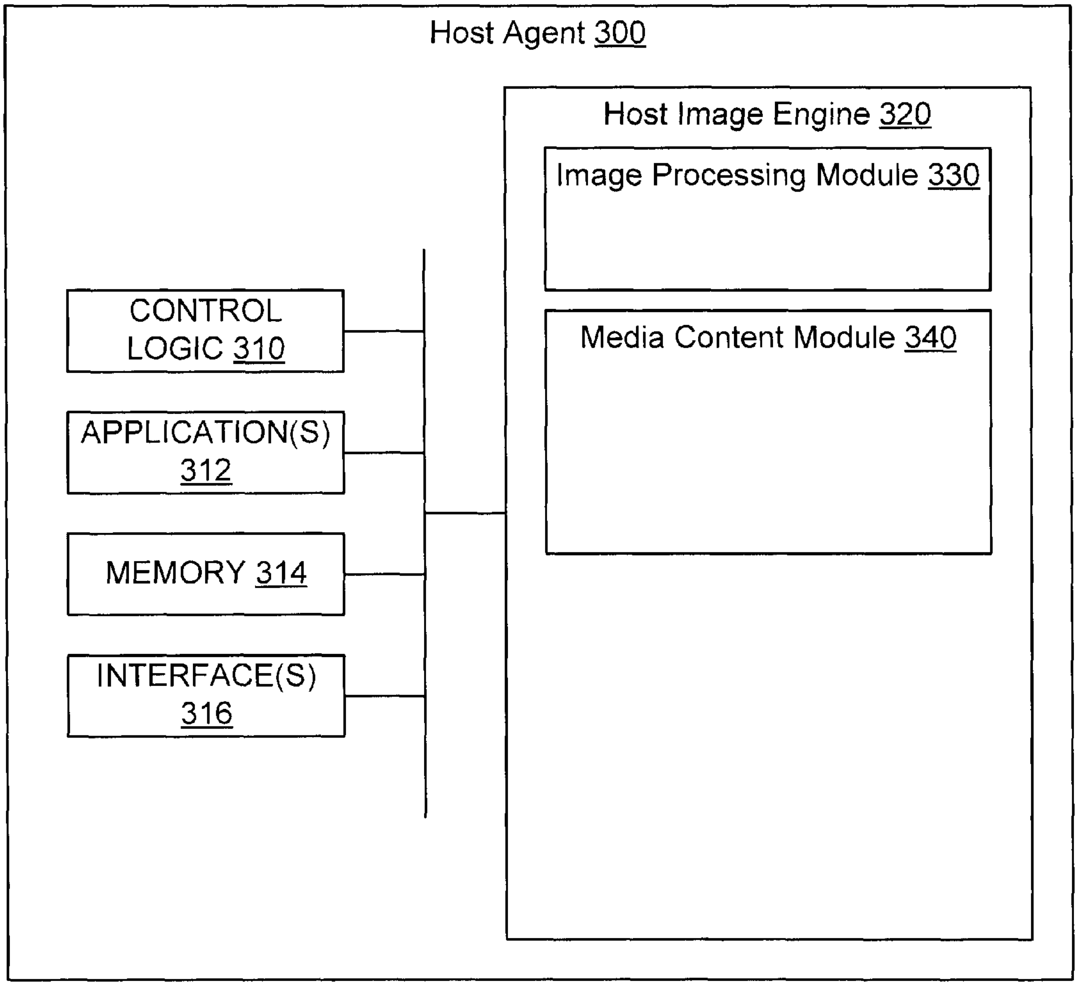
FIG. 3 is a block diagram of one embodiment of a host agent that may be resident on a host electronic device that provides data to a client electronic device.

FIG. 3 is a block diagram of one embodiment of a host agent that may be resident on a host electronic device that provides data to a client electronic device. Host agent 300 includes control logic 310, which implements logical functional control to direct operation of host agent 300, and/or hardware associated with directing operation of host agent 300. Logic may be hardware logic circuits and/or software routines. In one embodiment, host agent 300 includes one or more applications 312, which represent code sequence and/or programs that provide instructions to control logic 310.

Host agent 300 includes memory 314, which represents a memory device and/or access to a memory resource for storing data and/or instructions. Memory 314 may include memory local to host agent 300, as well as, or alternatively, including memory of the host system on which host agent 300 resides. Host agent 300 also includes one or more interfaces 316, which represent access interfaces to/from (an input/output interface) host agent 300 with regard to entities (electronic or human) external to host agent 300.

Host agent 300 also includes host image engine 320, which represents one or more functions that enable host agent 300 to provide image data (e.g., artwork) to a client device in a native format. Example modules that may be included in host image engine 320 are image processing module 330 and media content module 340. Each of these modules may further include other modules to provide other functions. As used herein, a module refers to routine, a subsystem, etc., whether implemented in hardware, software, or some combination.

Image processing module 330 may process or otherwise convert one or more images (e.g., artwork) so that the images are provided to a client device in a format that is native to the processing capability of the client device such that no (or minimal) processing is required by the client device to display the image. Images may be processed or converted, for example, by an image processing module (not illustrated in FIG. 3). Any conversion technique known in the art may be used. Media content module 340 may store or provide various forms of media to the client device. The media may include, for example, audio files, video files and/or audio/video files. Any type of data that can be provided to the client device may be provided by media content module 340 and/or other modules.

Figure 4:
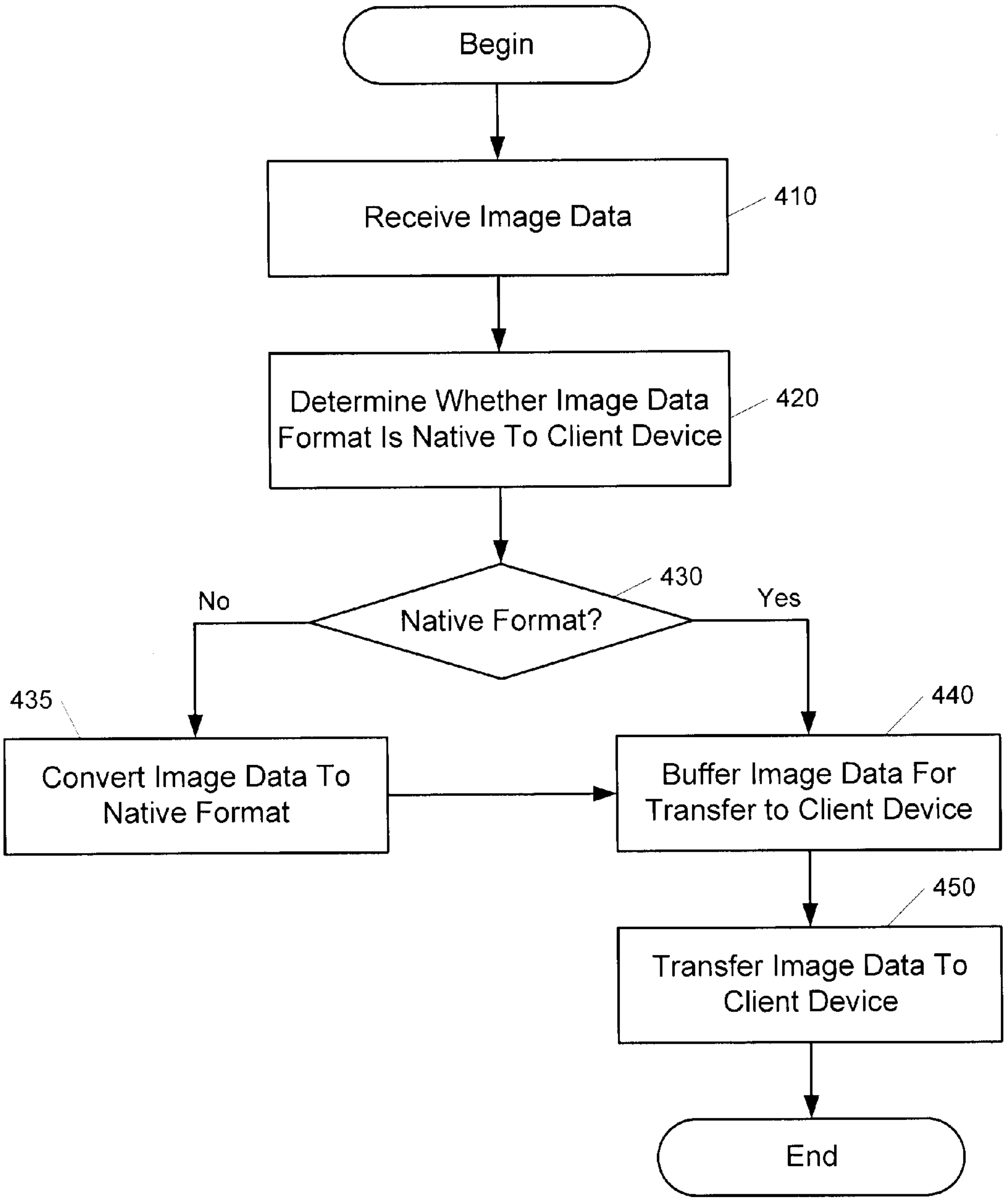
FIG. 4 is a flow diagram of one embodiment for a technique for processing image data on a host device.

FIG. 4 is a flow diagram of one embodiment for a technique for processing image data on a host device. In one embodiment, the host device is a desktop or laptop computer that may be connected to a client device. The connection with the client device may be wired or wireless.

Image data may be received by the host image engine or other device component, 410. The image data may be received in any manner known in the art. For example, the image data may be album artwork downloaded from a network connection by a desktop or laptop computer system. As another example, a map image may be generated based on input from a user. Any other type of image data may be similarly received and/or generated.

The host image engine or other device component may determine whether the image data is in a format that is native to the target client device, 420. In one embodiment, prior to transfer to the image data to the client device, the host image engine may receive an indication of the image format(s) natively supported by the client device.

If the image data is in a native image format, 430, the image data may be buffered (or otherwise stored) for transfer to the client device, 440. If the image data is not in a native image format, 430, the image data may be translated to a native image format, 435.

In one embodiment, the host image engine may include several translation modules or tables to allow translation between original format(s) and final format(s). Any translation techniques known in the art may be used. The translated image data may be buffered (or otherwise stored) for transfer to the client device, 440.

The native format image data may be transferred to the client device, 450. The image data may be transferred to the client device in any manner over a wired and/or a wireless connection. In one embodiment, the host device provides to the client device image data corresponding to images in varying levels of resolution. That is, for an image to be transferred to the client device, a higher-resolution version and a lower-resolution version may be provided. In alternate embodiments, more than two levels of resolution may be provided; however, for simplicity of description only two levels of resolution are described in most of the examples herein.

Figure 5:
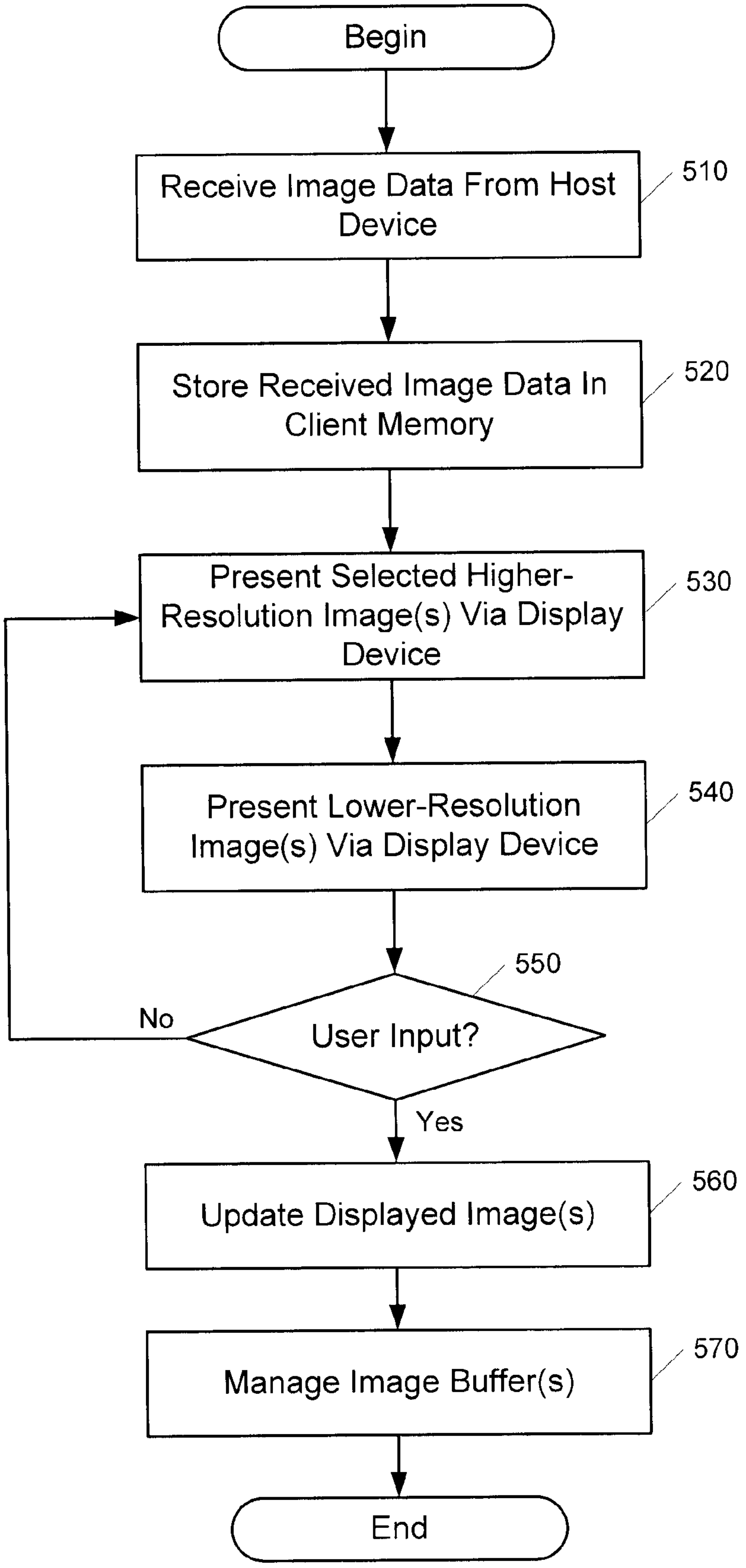
FIG. 5 is a flow diagram of one embodiment of a technique to manage and present image data on a memory-limited and/or bandwidth-limited client device.

FIG. 5 is a flow diagram of one embodiment of a technique to manage and present image data on a memory-limited and/or bandwidth-limited client device. The technique of FIG. 5 may be performed by any device that receives the native-format image data from a host device as described above. The client device may be, for example, a media playback device, a smartphone, a palmtop computing device, a personal digital assistant (PDA), or similar device.

The image data is received from the host device, 510. As discussed above, this may be via a wired and/or a wireless connection. The image data may be stored in a memory on the client device, 520. As discussed in greater detail below, subsets of image data may be stored in one or more buffers (or other memory structures) based on, for example, the images displayed by the client device. In one embodiment, the client device includes a memory to be used to store more images than are stored in the one or more buffers.

One or more of the higher-resolution images may be presented via a display device of the client device, 530. For example, if a media playback application were being used, album artwork for a currently playing song (or for a currently selected song) may be displayed. As another example, if a map were being displayed, a detailed map of a selected location may be displayed.

One or more of the lower-resolution images may also be presented via the display device of the client device, 540. Continuing the media playback example, the lower-resolution images may be presented to indicate additional media that may be selected such as, for example, other songs or albums. In the mapping example, lower-resolution images may be presented for alternate locations. One example of a graphical interface utilizing the techniques described herein is described below.

In one embodiment, the lower-resolution images are presented at a visual distance and/or perspective with respect to the higher-resolution image. The visual distance at which the lower-resolution images are presented may be selected so that the lower-resolution images look natural to the human eye. In an alternate embodiment, the lower-resolution image may be presented in another manner.

If no user input is received, 550, to cause the images to change, the higher-resolution image(s), 530, and the lower-resolution image(s), 540, may continue to be displayed. If user input is received, 550, to cause the images to change, the displayed image(s) may be updated, 560. In one embodiment, when the image(s) is/are changed, one or more buffers used to store the images are updated, or otherwise managed, 570. Embodiments for management of the buffers are described in greater detail below.

Figure 6:
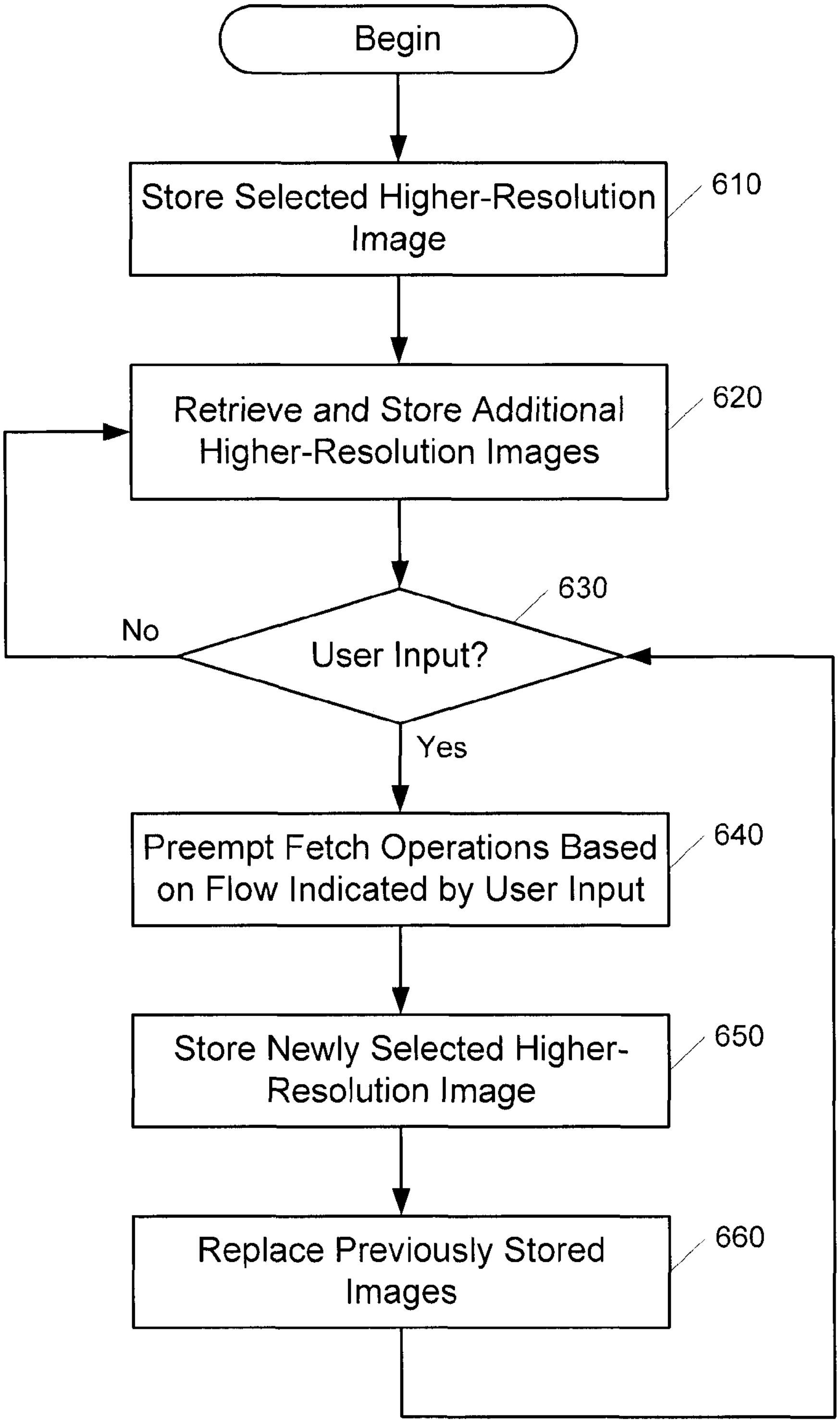
FIG. 6 is a flow diagram of one embodiment for management of a higher-resolution image buffer in a memory-limited and/or bandwidth-limited device.

FIG. 6 is a flow diagram of one embodiment for management of a higher-resolution image buffer in a memory-limited and/or bandwidth-limited device. A selected higher-resolution image is stored, 610. The selected image is the image to be displayed. In alternate embodiments, multiple higher-resolution images may be selected, displayed and stored.

Additional higher-resolution images are retrieved, 620. In one embodiment, the images displayed correspond to a list of objects. For example, album artwork may correspond to an album from a list of albums stored on the client device. The albums may be stored in an order, for example, alphabetically by artist name, alphabetically by album title, or any other ordering.

In one embodiment, a predetermined number of higher-resolution images are stored in a buffer that is ordered as a ring buffer. The number of images stored in the buffer may be determined based, at least in part, on the size of the buffer and the size of the individual images. In one embodiment, higher-resolution images corresponding to objects on each side of the selected image are retrieved from memory and stored in the buffer.

If no user input is received, 630, additional higher-resolution images may be retrieved and stored in the buffer if the buffer is not full. If user input is received, 630, pending fetch requests for additional higher-resolution images may be pre-empted based, at least in part, on the flow indicated by the user input, 640. For example, if a user provides input indicating a scrolling one direction through the ordered list of objects, fetch requests for higher-resolution images corresponding to objects located in the other direction may be terminated because those images will likely not be needed.

The newly selected higher-resolution image may be stored in the buffer, if that image is not currently stored in the buffer, 650. Additional higher-resolution images on either side of the selected image may be retrieved as described above and may replace images previously stored in the buffer, 660.

Figure 7:
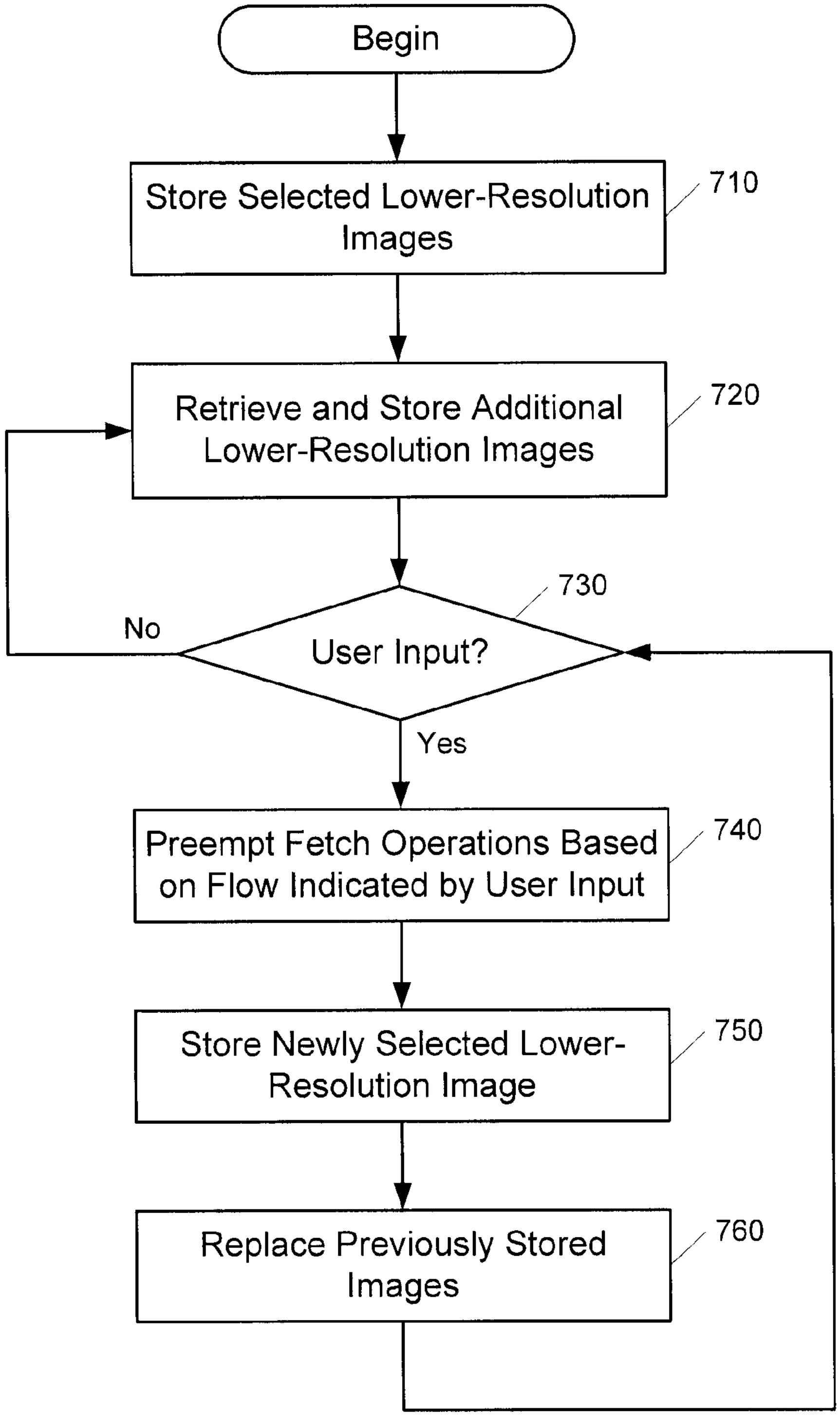
FIG. 7 is a flow diagram of one embodiment for management of a lower-resolution image buffer in a memory-limited and/or bandwidth-limited device.

FIG. 7 is a flow diagram of one embodiment for management of a lower-resolution image buffer in a memory-limited and/or bandwidth-limited device. One or more selected lower-resolution images are stored, 710. In one embodiment, the selected lower-resolution images are selected based, at least in part, on a previously selected higher-resolution image. Returning to the album artwork example, a pre-selected number of albums on either side of the selected album may be displayed as lower-resolution images. As described above, the lower-resolution images may be displayed at a different visual distance and/or a different perspective than the higher-resolution image. In alternate embodiments, the lower-resolution images may be displayed with the same perspective and/or the same visual distance as the higher-resolution image.

Additional lower-resolution images are retrieved, 720. In one embodiment, a predetermined number of lower-resolution images are stored in a buffer that is ordered as a ring buffer. The number of images stored in the buffer may be determined based, at least in part, on the size of the buffer and the size of the individual images. In one embodiment, higher-resolution images corresponding to objects on each side of the selected image are retrieved from memory and stored in the buffer.

In one embodiment, the buffer for the higher-resolution images and the buffer for the lower-resolution images are managed independently of each other. In one embodiment, the number of higher-resolution images stored in the buffer for the higher-resolution images is less than the number of lower-resolution images stored in the buffer for the lower-resolution images. In alternate embodiments, the number of images in the higher-resolution buffer may be the same and the number of images in the lower-resolution buffer, or the number of images in the higher-resolution buffer may be greater than the number of images stored in the lower-resolution buffer.

If no user input is received, 730, additional lower-resolution images may be retrieved and stored in the buffer if the buffer is not full. If user input is received, 730, pending fetch requests for additional lower-resolution images may be pre-empted based, at least in part, on the flow indicated by the user input, 740. For example, if a user provides input indicating a scrolling one direction through the ordered list of objects, fetch requests for lower-resolution images corresponding to objects located in the other direction may be terminated because those images will likely not be needed.

The newly selected lower-resolution images may be stored in the buffer, if the images are not currently stored in the buffer, 750. Additional lower-resolution images on either side of the selected image may be retrieved as described above and may replace images previously stored in the buffer, 760.

Figure 8:
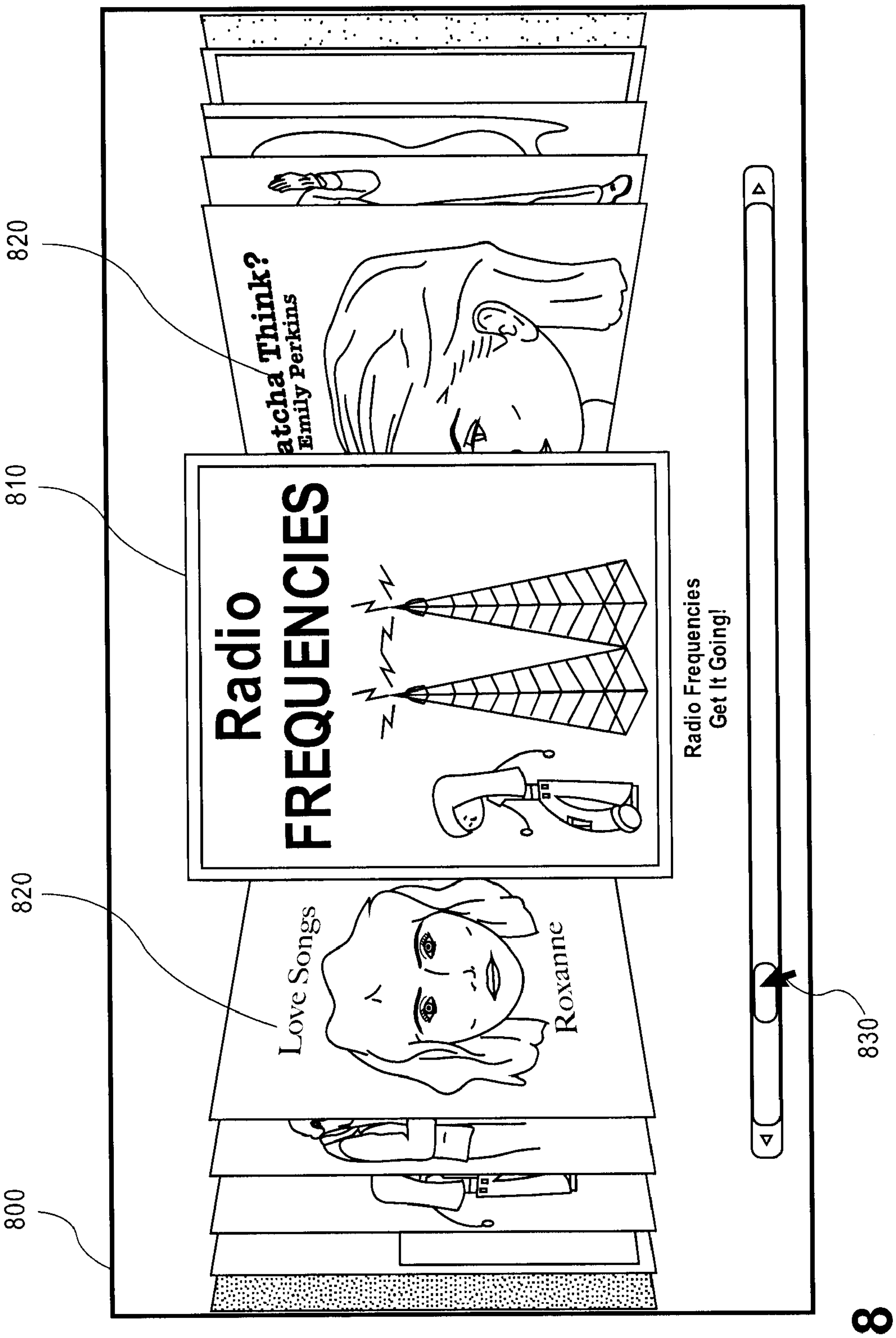
FIG. 8 illustrates one embodiment of a user interface that may provide higher-resolution images and lower-resolution images as described herein.

FIG. 8 illustrates one embodiment of a user interface that may provide higher-resolution images and lower-resolution images as described herein. The example of FIG. 8 illustrates album artwork in a media playback environment; however, the techniques described herein are applicable to many other graphical environments.

Window 800 may provide an environment in which one or more images may be displayed. In one embodiment, higher-resolution image 810 may be shown in a generally central area of window 800 while multiple lower-resolution images 820 are shown on either side of higher-resolution image 810.

Graphical slider 830 may allow a user to scroll or otherwise navigate through the images. In alternate embodiments, the user may scroll using a different input technique, for example, arrow keys on a keyboard (not shown in FIG. 8), a touch screen, voice recognition, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of displaying images on a device, the method comprising:

accessing source images available in different resolutions for display on a device, the source images being displayed as a navigable sequence of image primitives in an animated three-dimensional space, the navigable sequence of image primitives including background primitives and foreground primitives representing the image primitives as they move through the animated three-dimensional space, the background primitives occupying a smaller number of visible pixels than is occupied by the foreground primitives, wherein the source images are available in different resolutions, including source images having lower resolutions and higher resolutions, the source images with lower resolutions having a lower number of texels than the source images with higher resolutions;

providing a single texture of varying size for rendering an image primitive as it moves through the animated three-dimensional space;

selecting which source image from which to render the image primitive to minimize aliasing and filtering artifacts, wherein selecting is based on one or more of:

computing ratios between the number of visible pixels occupied by the image primitives and:

a number of texels comprising the source images having the lower resolutions, and the number of texels comprising the source images having the higher resolutions;

determining a resolution of the source images from which a least amount of up-scaling or down-sampling is generated during rendering the image primitives based on the computed ratios; and hardware filtering of the image primitive as it moves through the animated three-dimensional space; and rendering the image primitive from the selected source image.

2. A method as in claim 1, further comprising:

storing the source images with low resolution in a low resolution buffer and the source images with high resolution in a high resolution buffer;

receiving a user input indicating a directional flow in which the navigable sequence of image primitives is moving in the animated three-dimensional space;

purging old source images from the respective low resolution and high resolution buffers based on the directional flow indicating they are not likely needed for continued rendering of the navigable sequence of image primitives;

storing new source images to replace the old source images in the respective low resolution and high resolution buffers;

selecting which of the new source images from which to render the image primitives to minimize aliasing and filtering artifacts; and rendering from the selected new source images the background primitives and the foreground primitives representing the navigable sequence of image primitives moving in the animated three-dimensional space.

3. A method as in claim 1, wherein the source images available in different resolutions are files of a graphical representation, the files in a format natively supported by a hardware component of the device.

4. The method of claim 3 wherein the graphical representation comprises an artistic facsimile.

5. The method of claim 4 wherein the artistic facsimile comprises album artwork.

6. The method of claim 1 wherein the device comprises a mobile electronic device.

7. The method of claim 6 wherein the mobile electronic device comprises a cellular-enabled electronic device.

8. The method of claim 7 wherein the cellular-enabled electronic device comprises a smartphone.

9. The method of claim 6 wherein the mobile electronic device comprises a media playback device.

10. An article of manufacture comprising tangible computer-readable medium having instructions that, when executed, cause one or more processors to:

access source images available in different resolutions for display on a device, the source images being displayed as a navigable sequence of image primitives in an animated three-dimensional space, the navigable sequence of image primitives includes background primitives and foreground primitives representing the image primitives as they move through the animated three-dimensional space, the background primitives occupying a smaller number of visible pixels than is occupied by the foreground primitives, wherein the source images are available in different resolutions, including source images having lower resolutions and higher resolutions, the source images with lower resolutions having a lower number of texels than the source images with higher resolutions;

provide a single texture of varying size for rendering an image primitive as it moves through the animated three-dimensional space;

select which source image from which to render the image primitive to minimize aliasing and filtering artifacts, wherein selection is based on one or more of instructions to:

compute ratios between the number of visible pixels occupied by the image primitives and:

a number of texels comprising the source images having the lower resolutions, and the number of texels comprising the source images having the higher resolutions; and determine the resolution of the source images from which a least amount of up-scaling or down-sampling is generated during rendering the image primitives based on the computed ratios;

hardware filter of the image primitive as it moves through the animated three-dimensional space; and render the image primitive from the selected source image.

11. An article of manufacture as in claim 10, further comprising instructions that, when executed, cause one or more processors to:

store the source images with low resolution in a low resolution buffer and the source images with high resolution in a high resolution buffer;

receive a user input indicating a directional flow in which the navigable sequence of image primitives is moving in the animated three-dimensional space;

purge old source images from the respective low resolution and high resolution buffers based on the directional flow indicating they are not likely needed for continued rendering of the navigable sequence of image primitives;

store new source images to replace the old source images in the respective low resolution and high resolution buffers;

select which of the new source images from which to render the image primitives to minimize aliasing and filtering artifacts; and render from the selected new source images the background primitives and the foreground primitives representing the navigable sequence of image primitives moving in the animated three-dimensional space.

12. An article of manufacture as in claim 10, wherein the source images available in different resolutions are files of a graphical representation, the files in a format natively supported by a hardware component of the device.

13. An article of manufacture as in claim 12, wherein the graphical representation comprises an artistic facsimile.

14. The article of claim 13 wherein the artistic facsimile comprises album artwork.

15. An article of manufacture as in claim 10 wherein the device comprises a mobile electronic device.

16. The article of claim 15 wherein the mobile electronic device comprises a cellular-enabled electronic device.

17. The article of claim 16 wherein the cellular-enabled electronic device comprises a smartphone.

18. The article of claim 15 wherein the mobile electronic device comprises a media playback device.

19. A computer-implemented apparatus comprising a processor configured to perform:

means for accessing source images available in different resolutions for display on a device, the source images being displayed as a navigable sequence of image primitives in an animated three-dimensional space, wherein the navigable sequence of image primitives include background primitives and foreground primitives representing the image primitives as they move through the animated three-dimensional space, the background primitives occupying a smaller number of visible pixels than is occupied by the foreground primitives, and further wherein the source images available in different resolutions include source images having lower resolutions and higher resolutions, the source images with lower resolutions having a lower number of texels than the source images with higher resolutions;

means for providing a single texture of varying size for rendering an image primitive as it moves through the animated three-dimensional space;

means for selecting which source image from which to render the image primitive to minimize aliasing and filtering artifacts, wherein the means for selecting is based on one or more of:

means for computing ratios between the number of visible pixels occupied by the image primitives and:

a number of texels comprising the source images having the lower resolutions, and the number of texels comprising the source images having the higher resolutions; and means for determining a resolution of the source images from which a least amount of up-scaling or down-sampling is generated during rendering the image primitives based on the computed ratios; and means for hardware filtering of the image primitive as it moves through the animated three-dimensional space; and means for rendering the image primitive from the selected source image.

20. A computer-implemented apparatus as in claim 19, further comprising:

means for storing the source images with low resolution in a low resolution buffer and the source images with high resolution in a high resolution buffer;

means for receiving a user input indicating a directional flow in which the navigable sequence of image primitives is moving in the animated three-dimensional space;

means for purging old source images from the respective low resolution and high resolution buffers based on the directional flow indicating they are not likely needed for continued rendering of the navigable sequence of image primitives;

means for storing new source images to replace the old source images in the respective low resolution and high resolution buffers;

means for selecting which of the new source images from which to render the image primitives to minimize aliasing and filtering artifacts; and means for rendering from the selected new source images the background primitives and the foreground primitives representing the navigable sequence of image primitives moving in the animated three-dimensional space.

21. A computer-implemented apparatus as in claim 19, wherein the source images available in different resolutions are files of a graphical representation, the files in a format natively supported by a means for a filtering component of the device.

22. A system comprising:

a device having a processor, a memory, a display, an interface and a hardware filtering component, wherein:

the interface provides access to source images available in different resolutions for display on the display of the device, the source images being displayed as a navigable sequence of image primitives in an animated three-dimensional space, the navigable sequence of image primitives includes background primitives and foreground primitives representing the image primitives as they move through the animated three-dimensional space, the background primitives occupying a smaller number of visible pixels on the display area of the device than is occupied by the foreground primitives, the source images available in different resolutions include source images having lower resolutions and higher resolutions, the source images with lower resolutions having a lower number of texels than the source images with higher resolutions;

and further wherein the processor:

provides a single texture of varying size for rendering an image primitive as it moves through the animated three-dimensional space;

selects which source image from which to render the image primitive to minimize aliasing and filtering artifacts, wherein the selection is based on one or more of:

the processor computing ratios between the number of visible pixels occupied by the image primitives and:

a number of texels comprising the source images having the lower resolutions, and the number of texels comprising the source images having the higher resolutions; and the processor determining a resolution of the source images from which a least amount of up-scaling or down-sampling is generated during rendering the image primitives based on the computed ratios;

the hardware filtering component processing the image primitive as it moves through the animated three-dimensional space; and the processor rendering the image primitive from the selected source image while using a limited amount of the memory.

23. A system as in claim 22, further comprising:

a low resolution buffer and a high resolution buffer communicably coupled to the processor, wherein the processor stores the source images with low resolution in the low resolution buffer and the source images with high resolution in the high resolution buffer;

the interface receiving a user input indicating a directional flow in which the navigable sequence of image primitives moves in the animated three-dimensional space;

and further wherein the processor:

purges old source images from the respective low resolution and high resolution buffers based on the directional flow indicating they are not likely needed for continued rendering of the navigable sequence of image primitives;

stores new source images to replace the old source images in the respective low resolution and high resolution buffers;

selects which of the new source images from which to render the image primitives to minimize aliasing and filtering artifacts; and renders from the selected new source images the background primitives and the foreground primitives representing the navigable sequence of image primitives moving in the animated three-dimensional space.

24. A system as in claim 22, wherein the source images available in different resolutions are files of a graphical representation, the files in a format natively supported by the hardware filtering component of the device.

25. A system as in claim 22 wherein the device interface comprises a wired device.

26. The system of claim 25 wherein the wired interface comprises a Universal Serial Bus (USB) compliant wired interface.

27. A system as in claim 22 wherein the device interface comprises a wireless device.

28. The system of claim 27 wherein the wireless interface comprises a BLUETOOTH compliant interface.

29. The system of claim 27 wherein the wireless interface comprises an IEEE 802.11 compliant interface.

30. A system as in claim 22 wherein the device comprises a mobile electronic device.

31. The system of claim 30 wherein the mobile electronic device comprises a cellular-enabled electronic device.

32. The system of claim 31 wherein the cellular-enabled electronic device comprises a smartphone.

33. The system of claim 30 wherein the mobile electronic device comprises a media playback device.

* * * * *